United States Patent
Le Meur et al.

(10) Patent No.: US 11,371,364 B2
(45) Date of Patent: Jun. 28, 2022

(54) METHOD OF MANUFACTURING A COMPOSITE AIRCRAFT BLADE

(71) Applicant: Ratier-Figeac SAS, Figeac (FR)

(72) Inventors: Kévin Le Meur, Figeac (FR); Patrice Brion, Lunan (FR); Ludovic Prunet, Themines (FR)

(73) Assignee: RATIER-FIGEAC SAS, Figeac (FR)

( * ) Notice: Subject to any disclaimer, the term of this patent is extended or adjusted under 35 U.S.C. 154(b) by 730 days.

(21) Appl. No.: 15/984,798

(22) Filed: May 21, 2018

(65) Prior Publication Data

US 2018/0334913 A1   Nov. 22, 2018

(30) Foreign Application Priority Data

May 22, 2017   (EP) ..................... 17305592

(51) Int. Cl.
*F01D 5/28* (2006.01)
*B29C 70/24* (2006.01)
(Continued)

(52) U.S. Cl.
CPC .............. *F01D 5/282* (2013.01); *B29C 70/24* (2013.01); *B29C 70/30* (2013.01);
(Continued)

(58) Field of Classification Search
CPC ................. F01D 5/282; F01D 2220/30; F05D 2300/436; F05D 2300/601; F05D 2300/603; D10B 2101/12; D10B 2331/021; D10B 2331/061; D10B 2505/02; D04C 1/00; D04C 1/02; D04B 1/16; D03D 1/00; D03D 23/00; D03D 25/005; D02G 3/402; B29L 2031/08; B29L 2031/087; B29K 2071/00;
(Continued)

(56) References Cited

U.S. PATENT DOCUMENTS

| 4,539,249 A | 9/1985 | Curzio |
| 5,001,961 A | 3/1991 | Spain |

(Continued)

FOREIGN PATENT DOCUMENTS

| DE | 102013009932 A1 | * | 3/2014 | ............ D04H 13/00 |
| GB | 2492644 | * | 1/2013 | |
| WO | 9211126 A1 | | 7/1992 | |

OTHER PUBLICATIONS

EPO Official Letter for Application No. 17305592.2, mailed Apr. 24, 2020, 16 pages.

(Continued)

*Primary Examiner* — Camie S Thompson
(74) *Attorney, Agent, or Firm* — Cantor Colburn LLP

(57) ABSTRACT

A method of manufacturing a fabric structure for use in manufacturing a composite aircraft blade. The method comprises: combining yarns including both reinforcing material filaments and a matrix material with yarns of reinforcing material filaments and/or yarns including at least one filament of matrix material; or by combining yarns of reinforcing material filaments with yarns including at least one filament of matrix material; or by combining yarns each comprising both reinforcing material filaments and matrix material. Combining may comprise weaving, knitting or braiding. The matrix material may be a thermoplastic.

4 Claims, 4 Drawing Sheets

(51) Int. Cl.
*B29D 99/00* (2010.01)
*B29C 70/30* (2006.01)
*D03D 25/00* (2006.01)
*D04C 1/02* (2006.01)
*D04B 1/16* (2006.01)
*D03D 1/00* (2006.01)
*D04B 39/00* (2006.01)
*D03D 15/47* (2021.01)
*D03D 15/267* (2021.01)
*B29K 71/00* (2006.01)
*B29L 31/08* (2006.01)
*D03D 23/00* (2006.01)
*D04C 1/00* (2006.01)

(52) U.S. Cl.
CPC .......... *B29D 99/0025* (2013.01); *D03D 1/00* (2013.01); *D03D 15/267* (2021.01); *D03D 15/47* (2021.01); *D03D 25/005* (2013.01); *D04B 1/16* (2013.01); *D04B 39/00* (2013.01); *D04C 1/02* (2013.01); *B29K 2071/00* (2013.01); *B29L 2031/08* (2013.01); *D03D 23/00* (2013.01); *D04C 1/00* (2013.01); *D10B 2101/06* (2013.01); *D10B 2101/12* (2013.01); *D10B 2331/021* (2013.01); *D10B 2331/061* (2013.01); *D10B 2505/02* (2013.01); *F05D 2220/36* (2013.01); *F05D 2300/436* (2013.01); *F05D 2300/603* (2013.01); *F05D 2300/6012* (2013.01)

(58) Field of Classification Search
CPC .......... B29K 2101/12; B29D 99/0025; B29C 70/30; Y10T 442/3504; Y10T 442/313; Y10T 442/438; Y10T 442/627; Y10T 428/2924

USPC ...... 416/241 A, 229 A, 223 R, 230; 442/205, 442/212, 197, 243, 310, 353; 428/113, 428/542.8, 175, 364; 264/234, 103, 324; 156/148, 89.26; 87/33, 8; 29/889.71, 29/889.7; 57/243, 244
See application file for complete search history.

(56) References Cited

U.S. PATENT DOCUMENTS

| | | |
|---|---|---|
| 5,279,892 A | 1/1994 | Baldwin et al. |
| 5,672,417 A | 9/1997 | Champenois et al. |
| 8,499,450 B2 | 8/2013 | Naik |
| 8,715,556 B2 | 5/2014 | Murakami et al. |
| 2011/0002790 A1 | 1/2011 | Ebert et al. |
| 2011/0020130 A1 | 1/2011 | Murakami |
| 2012/0257983 A1 | 10/2012 | Williams |
| 2013/0017094 A1 | 1/2013 | Coup |
| 2013/0272893 A1 | 10/2013 | Fabre |
| 2016/0031182 A1 | 2/2016 | Quinn et al. |
| 2016/0186774 A1 | 6/2016 | Manicke et al. |
| 2016/0326891 A1 | 11/2016 | Roach |
| 2017/0037738 A1 | 2/2017 | Marin |

OTHER PUBLICATIONS

Hubner, M. et al. "Simulation-based investigations on the drape behavior of 3D woven fabrics made of commingled yarns", International, Journal of Material Forming, Springer Paris, Paris, vol. 9, No. 5, Jun. 24, 2015 (Jun. 24, 2015), pp. 591-599.
Extended European Seach Report for International Application No. 17305592.2 dated Nov. 23, 2017, 9 pages.

* cited by examiner

METHOD OF MANUFACTURING A COMPOSITE AIRCRAFT BLADE

FOREIGN PRIORITY

This application claims priority to European Patent Application No. 17305592.2 filed May 22, 2017, the entire contents of which is incorporated herein by reference.

TECHNICAL FIELD

The present invention relates to a method of manufacturing a fabric structure for use in manufacturing a composite aircraft blade, in particular a fabric structure comprising reinforcing filaments and a thermoplastic matrix material. A method of manufacturing a composite aircraft blade is also disclosed. The aircraft blade may for example be a fan blade for an engine such as a jet engine or gas turbine, or a propeller blade for an engine such as a turboprop engine or propfan.

BACKGROUND OF THE DISCLOSURE

Aircraft engines such as gas turbine engines or turboprop engines utilise rotating blades, such as fan blades and propeller blades, for accelerating air in order to provide thrust. Regarding fan blades in particular, they are a key component of gas turbine engines such as jet engines and serve to guide airflow and draw air into the engine, as well as to protect the engine from environmental hazards. Fan blades are typically the first component of a gas turbine engine to come into contact with the air, and are therefore vulnerable to high speed impacts from birds or other foreign objects. In addition, the fan blades must operate within the same conditions as the engine itself, which can include extremes of temperature, pressure, and airspeed. As a consequence the structure and manufacture of the fan blades is of great importance in the design of the engine. As such, there is a need to produce lightweight fan blades that are capable of withstanding impacts, while also being able to withstand the working temperatures and altitudes typically associated with gas turbine use.

Fan blades have been formed of reinforced thermoset composite materials to fulfil these requirements. Reinforced thermoset composite materials are known to be extremely strong and lightweight, giving rise to a high strength-to-weight ratio. This can reduce the weight of the engine and increase efficiency while enabling the fan blade to withstand large impact forces.

Various methods for manufacture of composite fan blades exist. For example, it is known to build up textile layers in a mould to form the shape of the blade, with the textile layers being pre-impregnated with a suitable matrix material such as a thermoplastic resin ('pre-preg' textiles) or with the matrix material being applied to each layer as the layers of textile are built up. Resin transfer manufacturing (moulding) (RTM) techniques are also used, where the textile layers are prepared in a mould absent any kind of matrix material, and the matrix material is then injected into the mould or drawn into the mould via vacuum in order to surround the textile with the matrix. RTM is commonly performed with a thermoset matrix material since thermosets have lower viscosity than thermoplastics. RTM processes utilising a thermoplastic matrix material require thermoplastics with a low viscosity, which result in poor mechanical properties.

One particular method for producing thermoplastic reinforced composite fan blades is discussed in US 2016/0186774. This method involves forming composite laminae by heating a thermoplastic resin to a liquid state, unidirectionally orienting reinforcement material fibres and impregnating the reinforcement material fibres with the liquid thermoplastic. These laminae are then cut to the desired shape and size and consolidated. The laminate is formed by stacking and shaping the laminae, and inserting reinforcement fibres through the multiple layers to stitch the laminae together. Consolidating forces or pressures are then used to press the laminate into the desired shape to form the final composite.

Another method of forming laminate thermoplastic reinforced composite fan blades discussed in US 2011/0020130 utilises additional molding steps to form a fan blade with a complex three dimensional shape. Multiple composite material laminae containing reinforcing fibre and thermoplastic matrix material are laminated into a planar shape. Next, the laminate is molded by applying heat and pressure to form a blade piece incorporating the desired three dimensional shape of the fan blade. The fan blade is formed of a plurality of these molded laminae by stacking them and applying heat and pressure to integrate them into the final product.

These methods both utilise processes that require the stacking of multiple layers of composite material to form a final composite product. This can lead to a number of issues. As the reinforcement fibres are oriented in only one direction, the resulting fan blade is only strengthened in one direction. There is also the possibility that the product may delaminate into its constituent layers. Furthermore, the welding or stitching of multiple layers adds increased complexity and time to the manufacturing process. Stitching, in particular, is difficult for a consolidated laminate.

An alternative method used to form thermoplastic reinforced composite components is discussed in US 2013/0017094. A fibre blank (preform) is made by three dimensionally weaving fibres of reinforcing material. The fibre blank is then placed in a mold having a recess corresponding with the final shape of the component. The mold is then closed, and a liquid precursor is injected to fill the recess and impregnate the fibre blank. The precursor can be in the form of a polymer, such as a thermoplastic, which may be diluted in a solvent. Once injected into the mold, the precursor is polymerised by applying a heat treatment, transforming the precursor into a thermoplastic with a longer polymer chain, thus increasing the impact resistance and melting temperature of the thermoplastic.

This method provides a thermoplastic reinforced composite component containing three dimensionally woven reinforcing fibres. Therefore, the component does not suffer from the problems caused by forming a laminate component, and the reinforcing material strengthens the composite material in three dimensions. However, thermoplastics with desirable physical properties for use in turbine engine components generally have a high viscosity, making it difficult to inject liquid thermoplastic matrix material into woven reinforcing fibres. It is also difficult to inject highly viscous thermoplastics into woven structures containing a high concentration of reinforcing fibres. Thus, complex and time consuming steps are required in order to impregnate a woven fibre structure with a thermoplastic matrix material.

Reinforced materials comprising thermoplastics offer an advantage over reinforced thermoset materials due to their high impact resistance and their ability to be remolded or reshaped. Fan blades made of reinforced thermoplastic composite materials could therefore be repaired more easily than those comprising thermosetting plastics. However, as discussed above, there are various difficulties associated with manufacturing thermoplastic composite blades. Hence, there is a need for an improved method of manufacturing reinforced thermoplastic composite components.

SUMMARY OF THE DISCLOSURE

Viewed from a first aspect, the present disclosure provides a method of manufacturing a fabric structure for use in manufacturing a composite aircraft blade, the method comprising: combining yarns including both reinforcing material filaments and a matrix material with yarns of reinforcing material filaments and/or yarns including at least one filament of matrix material; or combining yarns of reinforcing material filaments with yarns including at least one filament of matrix material; or combining yarns each comprising both reinforcing material filaments and matrix material.

Thus, yarns including both reinforcing material filaments and a matrix material may be combined with yarns of reinforcing material filaments. Yarns including both reinforcing material filaments and a matrix material may be combined with yarns including at least one filament of matrix material. Yarns of reinforcing material filaments may be combined with yarns including at least one filament of matrix material. Yarns each comprising both reinforcing material filaments and matrix material may be combined with other yarns each comprising both reinforcing material filaments and matrix material.

Combining may comprise weaving, knitting or braiding. Weaving may comprise weaving two-dimensional layers. In this case, the method may further comprise stitching layers together into a three-dimensional woven structure. Alternatively weaving, knitting or braiding may comprise three-dimensional weaving, knitting or braiding techniques to form a three-dimensional fabric structure. 3D weaving may be 3D interlock weaving. A three-dimensional fabric structure may also be called a preform.

In addition to one or more of the features described above, or as an alternative, the matrix material may comprise a thermoplastic material. This thermoplastic material may be considered a first thermoplastic. For example, the matrix material may comprise any one of polyether ether ketone (PEEK), polyetherketoneketone (PEKK), polyetherimide (PEI), polyphenylene sulfide (PPS) or polyaryletherketone (PAEK). Mixtures of these matrix materials may also be used.

In addition to one or more of the features described above, or as an alternative, the reinforcing material filaments may comprise carbon, glass, a second thermoplastic, an aramid or mixtures thereof. Reinforcing material filaments may also be called fibres.

Typically, a yarn comprising reinforcing material filaments may comprise many reinforcing material filaments, sometimes thousands of filaments.

In addition to one or more of the features described above, or as an alternative, yarns of reinforcing material filaments may comprise IM7 carbon yarns, IM8 carbon yarns, T700 carbon yarns or mixtures thereof.

In addition to one or more of the features described above, or as an alternative, the yarns may comprise stretch broken fibres.

The yarns including both reinforcing material filaments and a matrix material may each comprise a mixture of reinforcing material filaments and matrix material filaments combined to form a single comingled yarn. And/or the yarns including both reinforcing material filaments and a matrix material may each comprise one or more yarns of reinforcing material filaments twisted with one or more yarns including at least one filament of matrix material. And/or the yarns including both reinforcing material filaments and a matrix material may each comprise a yarn of reinforcing material filaments coated with matrix material. And/or the yarns including both reinforcing material filaments and a matrix material may each comprise a yarn of reinforcing material filaments powdered with matrix material.

Viewed from a second aspect, the present disclosure provides a fabric structure for the manufacture of a composite aircraft blade, the fabric structure comprising reinforcing filaments and a matrix material. Thus, the matrix material is combined within the initial fabric structure, e.g. a preform, which is then used in the manufacture of an aircraft blade.

The fabric structure may comprise: yarns including both reinforcing material filaments and a matrix material combined with yarns of reinforcing material filaments and/or yarns including at least one filament of matrix material; or yarns of reinforcing material filaments combined with yarns including at least one filament of matrix material; or yarns comprising both reinforcing material filaments and a matrix material combined with other yarns comprising both reinforcing material filaments and a matrix material. The fabric structure may be for the manufacture of a composite fan blade or a composite propeller blade.

The combined yarns may be combined into a woven, knitted or braided fabric structure. In other words, the yarns may be woven, knitted or braided together. A woven fabric structure may comprise multiple two-dimensional woven layers which are stitched together into a three-dimensional woven structure. Or alternatively, the fabric structure may be a three-dimensional woven, knitted or braided fabric. A 3D woven structure may be a 3D interlock structure. This may be termed a 3D interlock woven fabric. A 3D fabric structure may also be called a preform.

In addition to one or more of the features described above, or as an alternative, the matrix material may comprise a thermoplastic material. This thermoplastic material may be considered a first thermoplastic.

In addition to one or more of the features described above, or as an alternative, the matrix material may comprise any one of polyether ether ketone (PEEK), polyetherketoneketone (PEKK), polyetherimide (PEI), polyphenylene sulfide (PPS) or polyaryletherketone (PAEK). Mixtures of these matrix materials may also be used.

In addition to one or more of the features described above, or as an alternative, the reinforcing material fibres may comprise carbon, glass, a second thermoplastic, an aramid or mixtures thereof. In addition to one or more of the features described above, or as an alternative, yarns of reinforcing material filaments may comprise IM7 carbon yarns, IM8 carbon yarns, T700 carbon yarns or mixtures thereof.

In addition to one or more of the features described above, or as an alternative, the yarns may comprise stretch broken fibres.

The yarns including both reinforcing material filaments and a matrix material may each comprise a mixture of reinforcing material filaments and matrix material filaments combined to form a single comingled yarn. In addition, or instead, the yarns including both reinforcing material filaments and a matrix material may each comprise one or more yarns of reinforcing material filaments twisted with one or more yarns including at least one filament of matrix material. In addition, or instead, the yarns including both reinforcing material filaments and a matrix material may each comprise a yarn of reinforcing material filaments coated with matrix material. In addition, or instead, the yarns including both reinforcing material filaments and a matrix material may each comprise a yarn of reinforcing material filaments powdered with matrix material.

In embodiments, the fabric structure may be suitable for use as a core or an insert for the manufacture of a composite aircraft blade. The structure may be a hollow core, so that an insert can be placed therein.

In a further aspect there is provided a method of manufacturing a composite aircraft blade, the method comprising: placing the fabric structure according to any of the above described embodiments in a mold; thermoforming the fabric structure within the mold including applying a cycle with different temperatures and/or pressures to the mold to consolidate the fabric structure into a composite part and cooling the composite part within the mold to below the glass transition temperature of the matrix material, thereby forming a composite aircraft blade; and removing the composite aircraft blade from the mold.

After removing the composite aircraft blade from the mold the method may further comprise the step of machining the composite aircraft blade to form the final shape of the composite aircraft blade.

The method may further comprise performing an overmolding process on the composite aircraft blade to provide a thermoplastic matrix coating to the composite aircraft blade.

In yet another aspect there is provided a composite aircraft blade, such as a fan blade or a propeller blade, manufactured by any of the above described methods.

It will be readily appreciated by the skilled person that the various optional and preferred features of embodiments of the disclosure described above may be applicable to all the various aspects of the disclosure discussed.

BRIEF DESCRIPTION OF THE FIGURES

Certain preferred embodiments on the present disclosure will now be described in greater detail, by way of example only and with reference to the accompanying drawings, in which.

DETAILED DESCRIPTION

By way of example, the present disclosure is described in the context of a method of manufacturing a composite aircraft blade comprising a polyether ether ketone (PEEK) thermoplastic matrix material reinforced with carbon filaments. Whilst a composite comprising PEEK matrix and carbon filaments is considered advantageous, such materials are not essential, and other matrix materials and reinforcing material filaments may alternatively be used. For example, the matrix material may alternatively be polyetherketoneketone (PEKK), polyetherimide (PEI), polyphenylene sulfide (PPS) or polyaryletherketone (PAEK). Similarly, the reinforcing material may alternatively be glass filaments or aramid filaments.

A method of manufacturing a composite aircraft blade, in particular a fan blade, according to an embodiment of the disclosure will now be described in relation to the method steps illustrated in FIG. 1. At step 12, a three-dimensional fabric structure is formed by weaving together comingled yarns that contain both carbon filaments and PEEK filaments. It will be appreciated that such a three-dimensional fabric structure may also be termed a three-dimensional woven preform.

Other fabric manufacturing processes may alternatively be used to form the three-dimensional fabric structure. For example, the three-dimensional fabric structure may alternatively be formed by knitting or braiding yarns together. Such structures may be known as knitted preforms or braided preforms.

Figure 2:
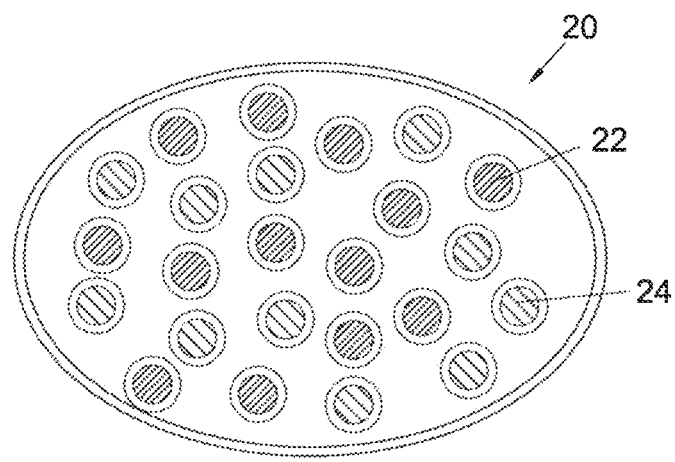
FIG. 2 illustrates a cross section of an exemplary comingled yarn.

An example of a comingled yarn 20 is shown in cross section in FIG. 2. In this example, the comingled yarn comprises a mixture of both carbon filaments 22 and PEEK filaments 24, combined to form a single yarn.

In other embodiments, other types of yarns including both reinforcing material filaments and a matrix material may be used. For example, one or more yarns containing reinforcing material filaments may be twisted with one or more yarns containing at least one matrix material filament. Or, a yarn comprising reinforcing material filaments may be coated with matrix material. Or, a yarn comprising reinforcing material filaments may be powdered with matrix material.

Such yarns including both reinforcing material filaments and a matrix material are known to those skilled in the art.

Mixtures of any two or more of the above types of yarn may also be used.

Instead of (or in addition to) using yarns including both reinforcing material filaments and a matrix material, yarns comprising only reinforcing material filaments and yarns comprising only matrix material filaments may be woven together to form the three-dimensional fabric structure. For example, the three-dimensional fabric structure may be formed by weaving yarns containing only reinforcing material filaments with yarns containing only matrix material filament(s).

The yarns may be formed of stretch broken filaments, comprising discontinuous filaments. Yarns of stretch broken filaments are more pliable and can be more easily formed into complex shapes than yarns containing continuous filaments. Alternatively, the yarns may comprise continuous filaments.

Thus, as described above, the matrix material is combined with the reinforcing material in the three-dimensional structure. In the presently described embodiment, the matrix material is woven within the preform.

The provision of a three-dimensional fabric structure removes the need to layer individual laminae to form a three-dimensional composite component, and also provides three-dimensional reinforcement to the composite component. This removes the need to stitch or weld numerous laminae together in order to form a laminate product, thus enabling the product to be produced more quickly and easily. This process also obviates the problem of delamination of the composite product by providing full three-dimensional reinforcement. The resulting composite component therefore has a superior strength and impact resistance compared to a laminated component.

Figure 3:
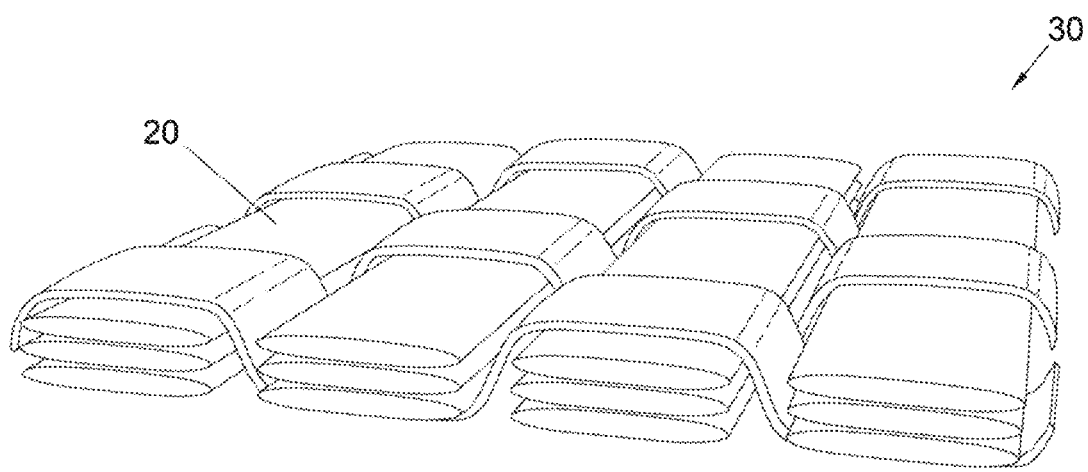
FIGS. 3 and 4 illustrate examples of three-dimensional woven preforms.
Figure 4:
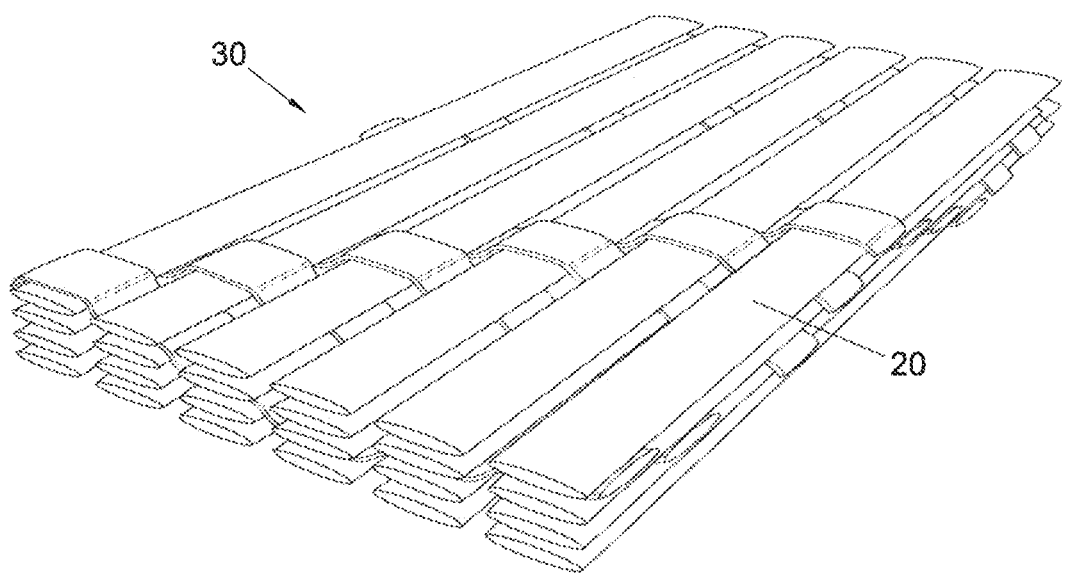

Example 3D woven preforms 30 are illustrated in FIGS. 3 and 4. These Figures each schematically illustrate a small segment of a 3D woven preform 30 according to embodiments of the invention. In these embodiments, comingled yarns 20 comprising both carbon filaments 22 and PEEK 24 filaments are woven together in a three-dimensional shape.

Figure 1:
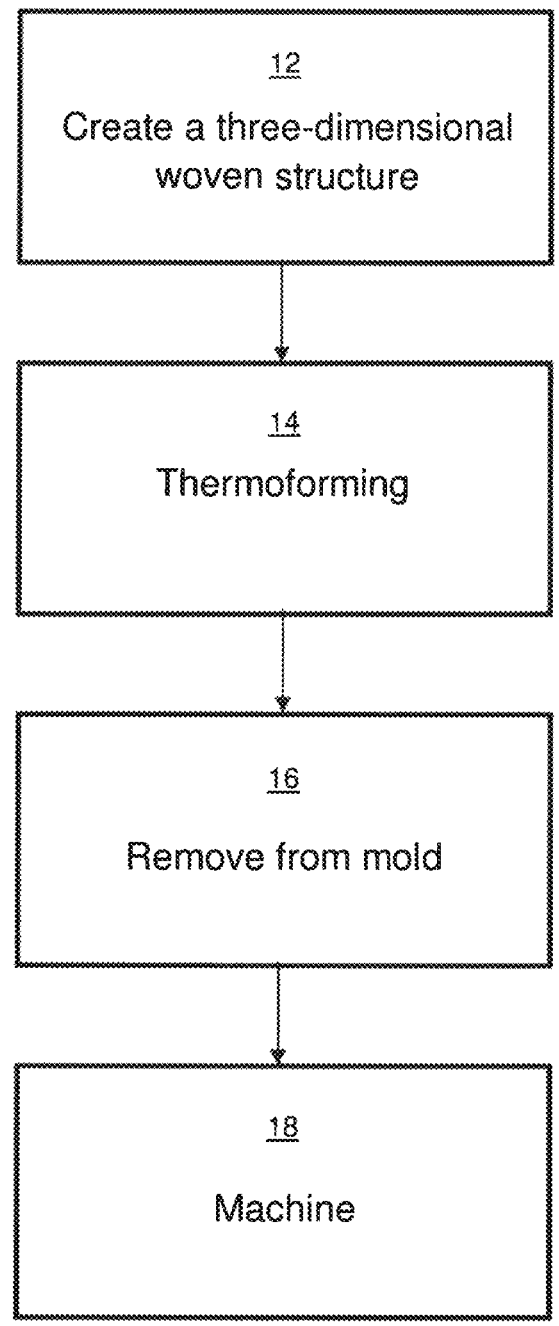
FIG. 1 is a flow diagram illustrating the steps required to manufacture a composite aircraft blade according to an embodiment of the disclosure.

Returning now to the process illustrated in FIG. 1, at step 14, the three-dimensional woven preform undergoes a thermoforming process to form and consolidate the composite fan blade.

The woven preform is placed into a mold cavity (the mold cavity having the shape of the desired fan blade). A thermoforming temperature/pressure cycle is then carried out to consolidate the fan blade. Firstly, the mold is heated above the melting temperature of the PEEK so that the matrix material becomes liquid. In order to ensure that all of the PEEK woven within the woven preform is melted, the woven preform should generally be heated to at least 343° C. A small pressure is applied to the materials within the mold during the heating process in order to maintain contact between the PEEK and the carbon filaments. This ensures that the liquid PEEK fills any gaps between the carbon filaments. By melting the PEEK, the woven preform becomes impregnated with liquid PEEK and is immersed within the liquid PEEK matrix material. The liquid PEEK takes the shape of the mold, thus the matrix material takes the shape of a fan blade. The pressure is then increased to a "forming pressure", to form the part. The skilled person would readily be able to determine suitable temperatures and pressures to apply according to the particular situation.

Figure 5:
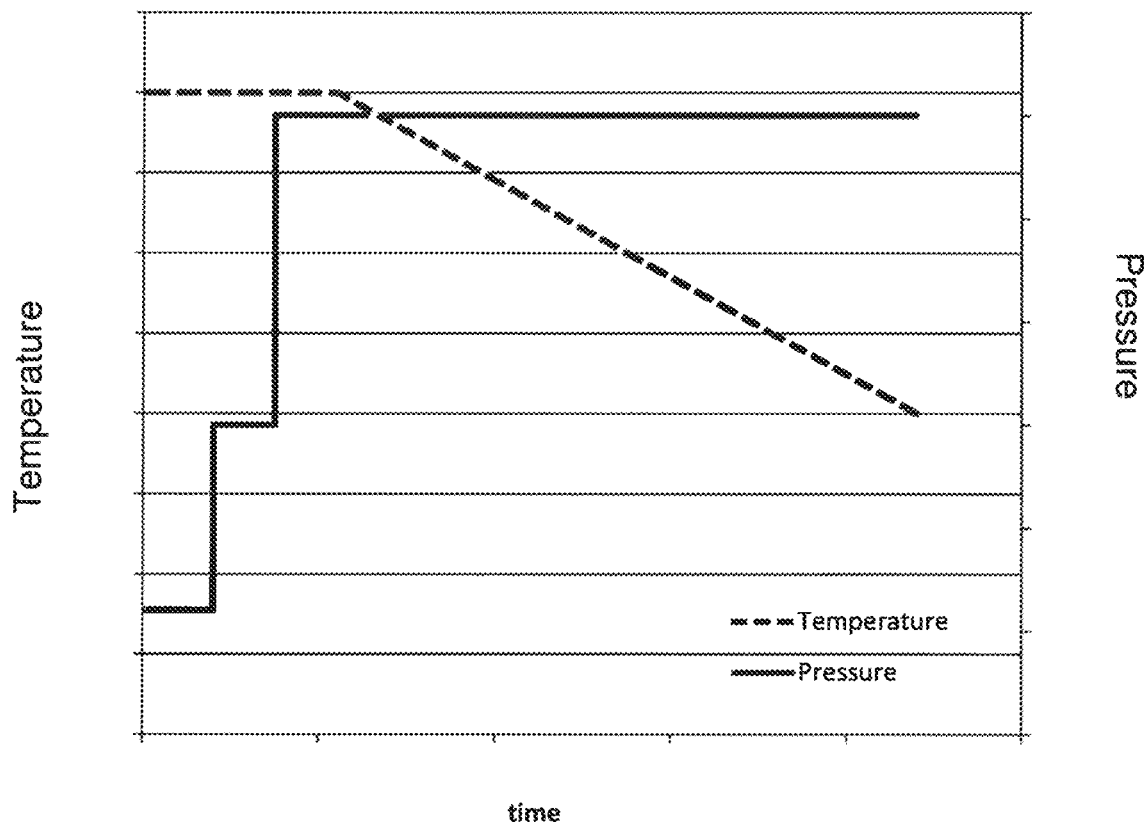
FIGS. 5 and 6 illustrate exemplary temperature and pressure cycles applied to consolidate the composite material.

An example thermoforming cycle for such a carbon filament—PEEK composite is schematically shown in FIG. 5. In this example, the temperature cycle comprises heating the three-dimensional woven preform to a temperature above the melting point of the PEEK matrix material, followed by cooling it gradually to below the glass transition temperature of the PEEK matrix material (143° C.), ready for demoulding. In conjunction with this temperature cycle, a pressure cycle comprises applying a small pressure (i.e. a first low pressure, just to keep the materials in contact) to the woven preform. The pressure is then raised as the matrix begins to melt. Then, once the matrix is melted a higher pressure is applied to form the part, and this higher pressure is maintained for the remainder of the pressure cycle.

Figure 6:
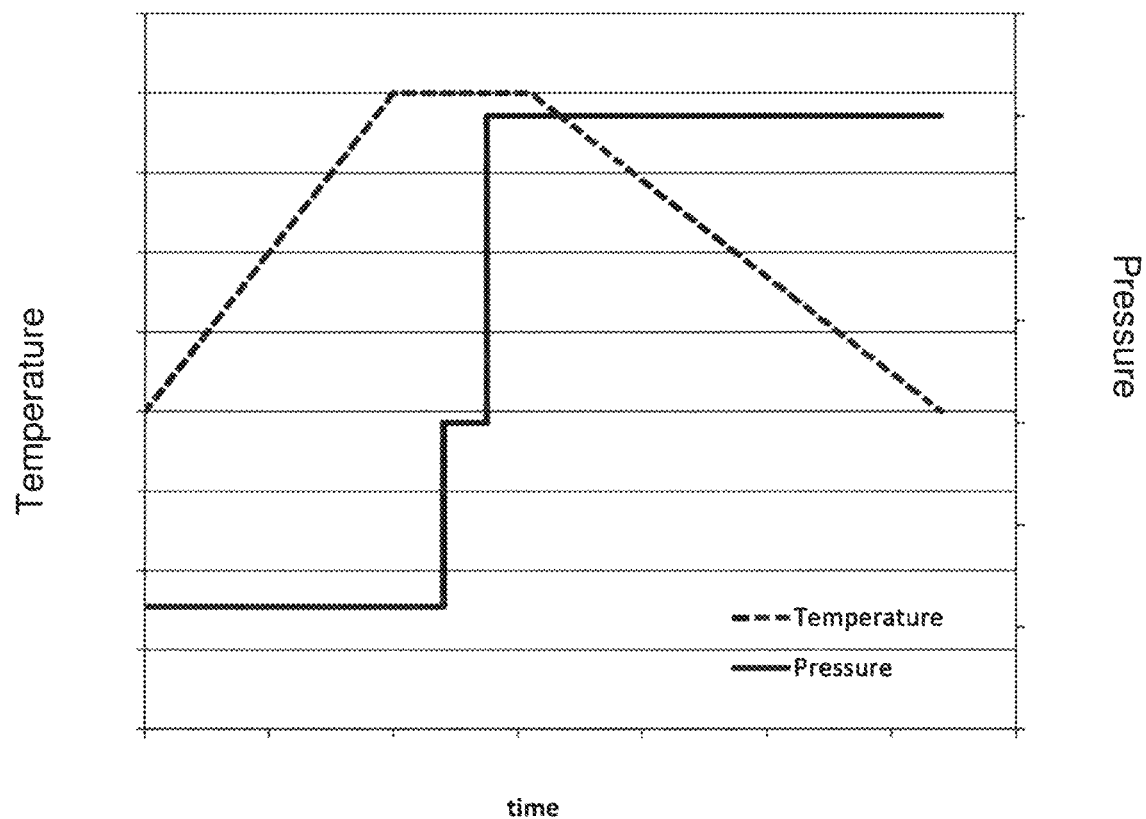

Another example thermoforming cycle for a carbon filament—PEEK composite is schematically illustrated in FIG. 6. The temperature cycle comprises gradually heating the woven preform to above the melting point of the PEEK matrix material. The temperature is then maintained at this value before being gradually reduced to below the glass transition temperature of the PEEK matrix material. Simultaneously, a pressure cycle comprises applying a small pressure to the woven preform. The pressure is then raised, and then raised once more and maintained at this pressure for the remainder of the pressure cycle. In other words, this thermoforming includes gradually raising the temperature whilst the pressure remains unchanged, holding the temperature constant whilst the pressure is increased in step changes to a forming pressure, and then gradually reducing the temperature to ambient temperature.

While the composite part cools within the mold, the PEEK matrix material impregnated within the woven preform cools and solidifies in the required shape. Once the PEEK has cooled to below its glass transition temperature the composite part can be removed from the mold (step 16). For example, when the matrix material comprises PEEK, the composite part must be cooled to below 143° C. before it can be removed from the mold. By removing the composite part from the mold at a temperature below the glass transition temperature of the matrix material, it is ensured that the matrix material has hardened sufficiently so that it does not deform once it is removed from the mold.

The composite part removed from the mold is the composite aircraft blade. This may be formed net shaped so that no additional machining is required to obtain the desired blade geometry. However, optionally, a further step 18 may be carried out in which the composite blade is machined into the desired finished shape. Alternatively, or in addition, an overmolding process may be applied to the composite blade to provide a thermoplastic matrix coating to the blade.

Figure 7:
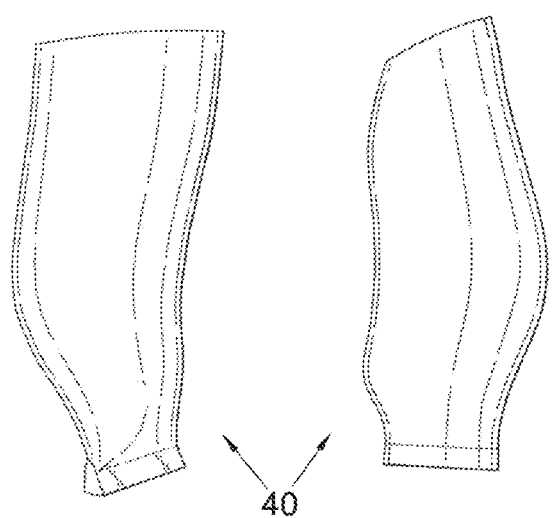
FIG. 7 illustrates perspective views of a composite aircraft blade formed using a method according to an embodiment of the disclosure.

A fan blade 40 produced according to the above described method is illustrated in FIG. 7.

Since the PEEK matrix material is within the yarns which are woven together, there is no need to impregnate the woven preform with liquid PEEK after it has been formed. This is advantageous because it is difficult to inject thermoplastics into conventional woven preforms due to the high viscosity of liquid thermoplastics. Consequently it is difficult to fully impregnate conventional woven preforms with thermoplastic matrix material, and also to inject thermoplastics into woven preforms containing a high density of reinforcing material filaments. When the matrix material is part of the yarns that are woven together into the woven preform and this is heated in accordance with the present disclosure, the matrix material melts and the liquid matrix material impregnates the reinforcing material filaments. This allows for quicker and easier manufacturing, avoiding the need for complex prior art manufacturing steps. It will be appreciated that these advantages are equally applicable for all different types of reinforcing material, and for structures manufactured by techniques other than weaving, e.g. knitting or braiding. The important feature is that the matrix is combined within the initial fabric structure, so that subsequent injection of matrix material is not required.

One difficult manufacturing step avoided by the present disclosure is the polymerisation of the thermoplastic matrix material once it has impregnated the woven preform, which is required in the prior art. Thermoplastics comprising smaller polymer chains are less viscous than those with longer polymer chains. However, thermoplastics with small polymer chains do not possess the necessary properties for use in the manufacture of aircraft blades. Often, thermoplastics comprising small polymer chains are injected into a woven preform and polymerised in order to produce longer polymer chains. In the presently disclosed method this process is not required so there is no need to perform any chemical polymerisation reactions once the thermoplastic has impregnated the woven preform. Since such steps are obviated by the present disclosure, the process of the present disclosure is simpler and quicker than prior art processes for manufacturing aircraft blades.

Thus, it will be appreciated that the method of this disclosure enables reinforced thermoplastic composite aircraft blades to be manufactured more quickly and more easily than other previously disclosed methods. Typically, thermosetting matrix materials have been utilised in composite aircraft blades because of their relative ease of production. Thermosetting plastics have lower viscosity than thermoplastics, and therefore do not suffer from many of the issues caused when injecting the matrix material into the woven preform. However, thermoplastic materials are known to have superior mechanical resistance properties when compared with thermosetting plastics. Thermoplastics can also be remolded or reshaped allowing for simple and cost effective repair of thermoplastic components. Thus, the method of the present disclosure which provides a process in which a three-dimensional preform is used with a thermoplastic, but in which the thermoplastic does not need to be injected, allows for the improved production of aircraft blades with better resistance to high speed impacts with birds and other foreign objects.

Aircraft blades produced by the method of the disclosure benefit from increased impact resistance due to the combination of a 3D fabric structure and a thermoplastic matrix. Another advantage is the failure propagation, the PEEK has a G1c of 2000 J/m$^2$ compared to the thermoset solution (G1c for RTM6: 200 J/m$^2$ and 203ST: 1000 J/m$^2$). Following the recommendations made in US005672417A, a G1c of minimum 2000 J/m$^2$ is desirable to avoid damage from bird impact.

Furthermore, thermoplastic is more easily stored than thermoset, which avoids issues due to expiration date. Moreover, there is no chemical reaction during the manufacturing process, and thus no hazardous chemicals are produced.

Although the present disclosure has been described in the context of a method of manufacturing a composite fan blade, the disclosed method is equally applicable for the manufacture of other aircraft blades, such as composite propeller blades.

The invention claimed is:

1. A method of manufacturing a fabric structure for use in manufacturing a composite aircraft blade, the method comprising:

combining yarns comprising both reinforcing material filaments and filaments of matrix material with other yarns comprising reinforcing material filaments and filaments of matrix material by three-dimensional weaving, knitting or braiding techniques to form a three-dimensional fabric structure.

2. A method as claimed in claim 1, wherein the matrix material comprises a thermoplastic material.

3. A method as claimed in claim 1, wherein the reinforcing material filaments comprise carbon, glass, a thermoplastic, an aramid or mixtures thereof.

4. A method as claimed in claim 1, wherein the yarns including both reinforcing material filaments and a matrix material each comprise:

a mixture of reinforcing material filaments and matrix material filaments combined to form a single comingled yarn;

and/or one or more yarns of reinforcing material filaments twisted with one or more yarns including at least one filament of matrix material;

and/or a yarn of reinforcing material filaments coated with matrix material;

and/or a yarn of reinforcing material filaments powdered with matrix material.

* * * * *